J. SLADDIN.
MACHINE FOR MAKING LOOM HARNESS.
No. 4,510. Reissued Aug. 8, 1871.
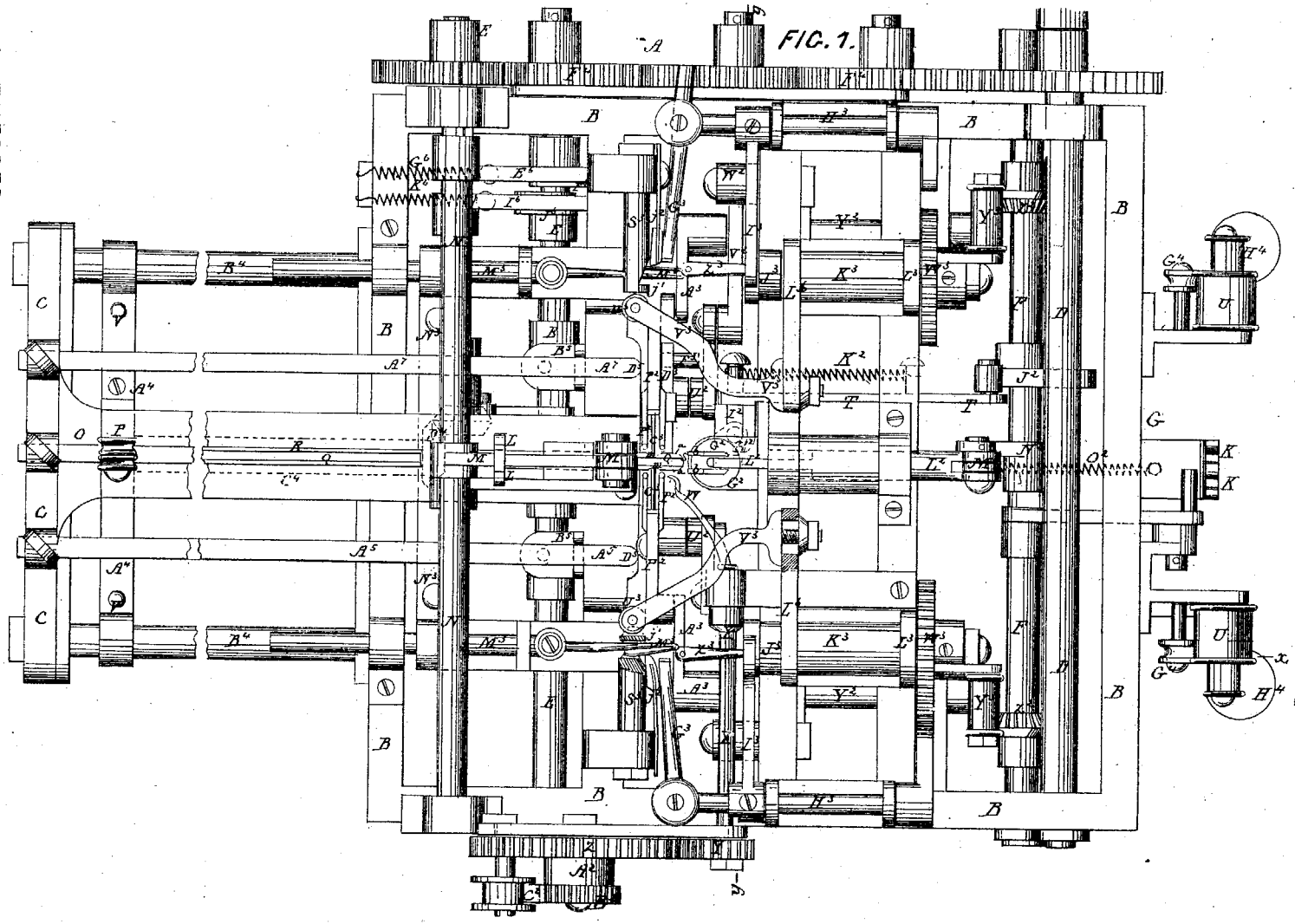
WITNESSES.
Chas. J. Taylor
Reimund Jager
INVENTOR.
Joseph Sladdin per
Munn Brothers Attorneys.

J. SLADDIN.
MACHINE FOR MAKING LOOM HARNESS.
No. 4,510. Reissued Aug. 8, 1871.
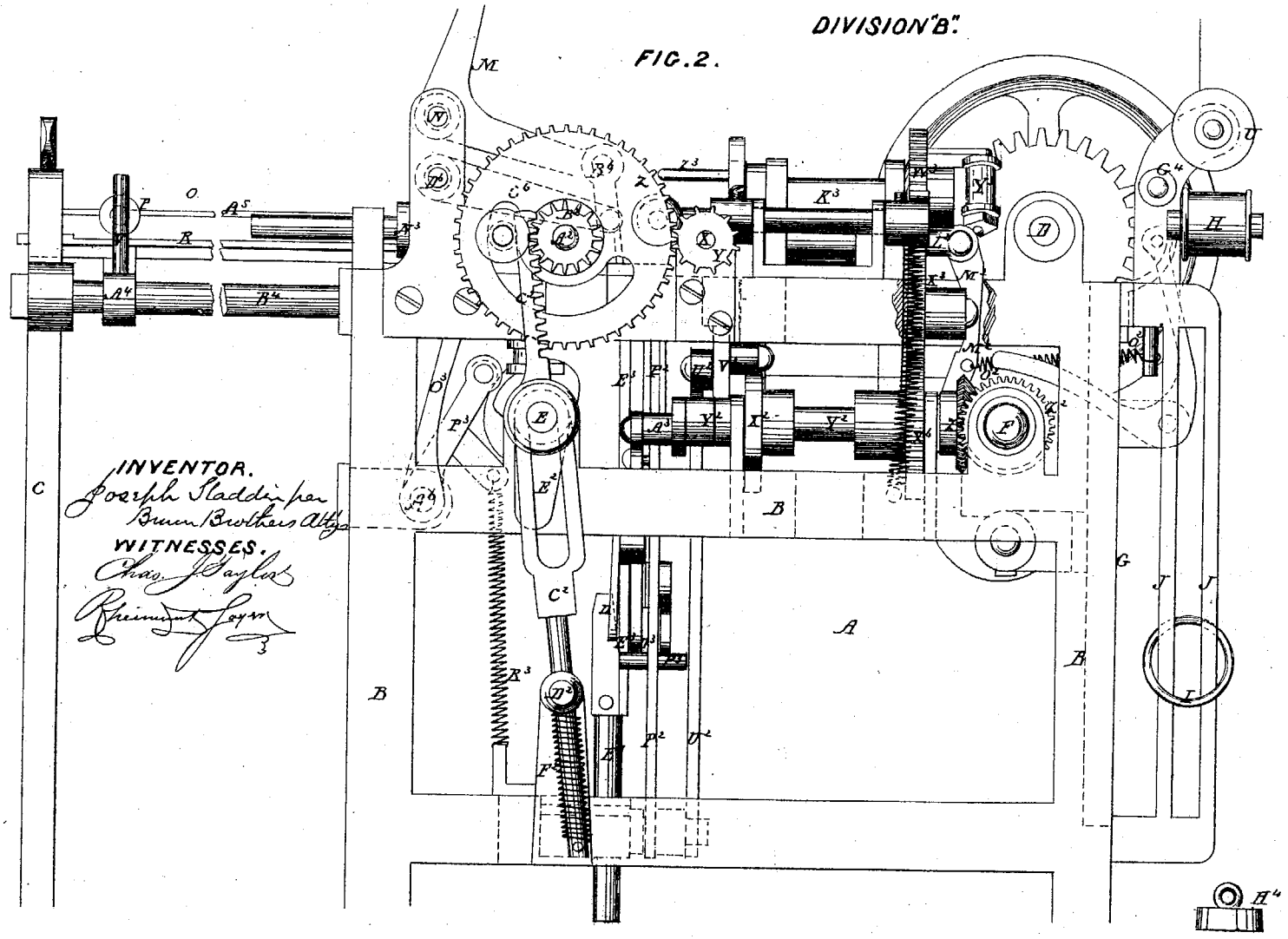

J. SLADDIN.
MACHINE FOR MAKING LOOM HARNESS.
No. 4,510. Reissued Aug. 8, 1871.
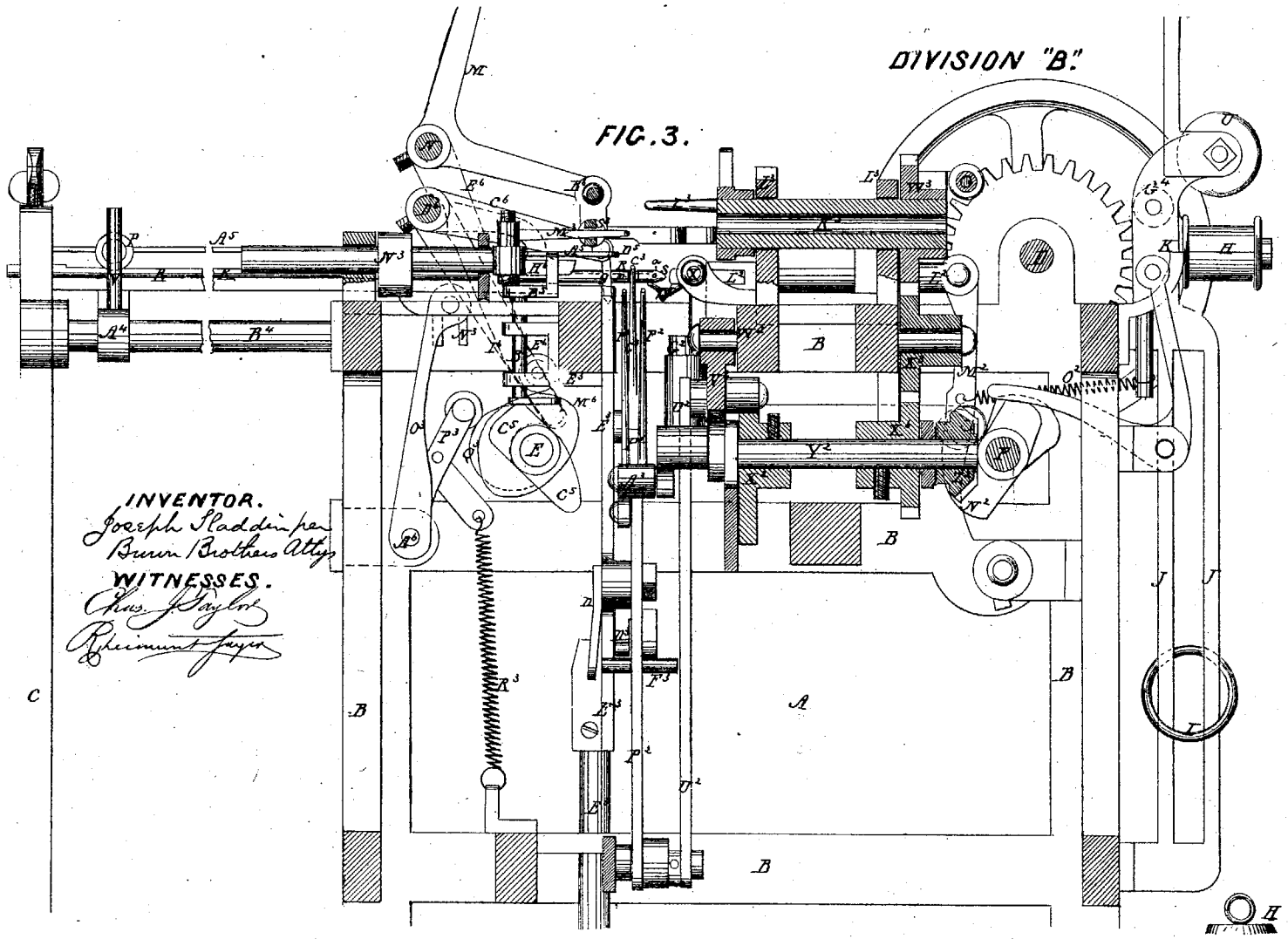

J. SLADDIN.
MACHINE FOR MAKING LOOM HARNESS.
No. 4,510. Reissued Aug. 8, 1871.
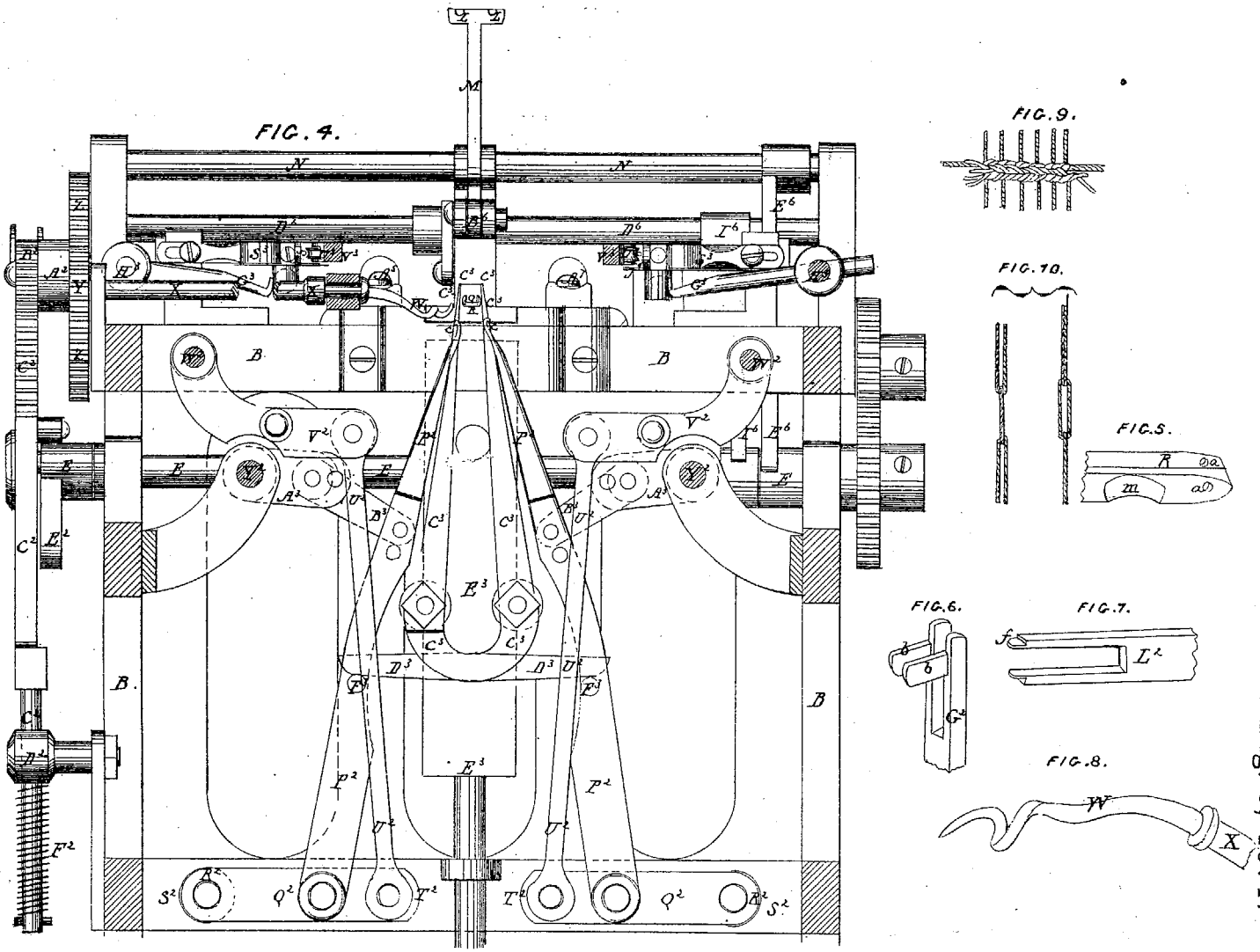
WITNESSES.
Chas. J. Taylor
Rheinhart Joyce
INVENTOR.
Joseph Sladdin per
Munn Brothers Attys.

UNITED STATES PATENT OFFICE.

JOSEPH SLADDIN, OF LAWRENCE, MASSACHUSETTS.

IMPROVEMENT IN MACHINES FOR MAKING LOOM-HARNESS.

[illegible] forming part of Letters Patent No. 80,774, dated August 4, 1868; reissue No. 4,510, dated August 8, 1871.

DIVISION B.

*To all [illegible] it may concern:*

Be it known that I, JOSEPH SLADDIN, of Lawrence, in the county of Essex and State of Massachusetts, have invented a certain new and useful Improvement in Machine for Making Harness for Looms, of which the following is a full, clear, and exact description, reference being had to the accompanying drawing forming part of this specification.

The present invention relates to improvements in machinery arranged for the manufacture of that class of loom-harness having its eyes or heddles made from continuous yarn by using two continuous lengths of yarns, from one of which the heddle-eyes are made, with the other yarn looped around one end of each and every eye in turn, and both secured to the rig-bands, completing the harness. The invention particularly relates, however, to that class of said machinery in which are arranged a two-eyed needle, a yarn-twister, a heddle-eye former, a pusher for pushing the heddle-eye onto the needle, and carriers for automatically carrying the heddle-yarns to the rig-bands; and the invention consists: First, of a peculiar arrangement of mechanism for operating the twister. Second, of a peculiar device arranged at each rig-band for receiving from the yarn-carriers their yarns and holding them for being taken by barbed needles or other means and knit to the rig-bands. Third, of a continuously-revolving hollow cylinder arranged at each rig-band for the rig-bands to pass through from end to end, each cylinder being provided with a bobbin of yarn and a guide-eye for the same, and combined with the yarn-holders and the knitting mechanism, through the action of which mechanisms the lapping-yarns are secured, together with the heddle-yarns, to the rig-bands. Fourth, of guides for the barbed or knitting-needles, through which the needles are arranged to pass, in combination with presser-wheels adapted to bear against said needle-guides, and hold against them the rig-bands, as by the knitting-needles the heddle-yarns are stitched thereto.

In the accompanying drawing my improvement in machines for making loom-harness is illustrated. Figure 1, in plate 1, is a plan view of a machine of the class to which they relate, showing them severally; Fig. 2, in plate 2, a side elevation; Fig. 3, in plate 3, a vertical longitudinal section of the machine in the plane of a line drawn between the points *x* and *x* of Fig. 1. Fig. 4, in plate 4, is a transverse vertical section in the plane of a line drawn between the points *y* and *y* of Fig. 1, deviating therefrom where such part of said line would strike the heddle-eye former, and passing them between said former and the end of stationary needle; Figs. 5, 6, 7, and 8, views in detail of some parts of the machinery; and Figs. 9 and 10, views, respectively, of a rig-band with the harness-yarns knit to it, and of a proportion of the heddles.

A in the drawing represents a frame-work made of any suitable construction to receive the working and stationary parts of the machine, it being shown in the present instance of a main frame, B, rectangular in shape, with a frame, C, extended from one end thereof. D, the driving-shaft, arranged transversely to the frame B, and to turn in standards on the upper side of frame-wor .

To this driving-shaft D power is to be communicated in any suitable manner by belt or gearing, and through it to the other moving parts of the machinery. By the revolution of shaft D are driven, through suitable intermediate gearing, with a continuous rotary movement, the primary shafts following, viz.: Shaft E, by which, with a disposition of mechanism to be hereinafter described, are moved the twister, the knitting-needles, and the forked lever for holding the heddle-eye in shape, and the fingers between tines of yarn-carriers. Shaft F, by which, with a proper disposition of mechanism, to be hereinafter described, motion is communicated to the heddle-eye former, to the pushers of the heddle-eyes upon the needle, to the carriers of the heddle-yarns, to rig-bands, to the lapper-cylinders, and to fingers for receiving the yarns from their carriers, and to hold them while being knit to the rig-bands. At the end G of upper portion of frame-work are located two bobbins, H, one each side of the central line of the machine, said bobbins H being suspended on horizontal spindles and containing the yarns from which harness is to be made. These yarns are passed from the bobbins H down through rings I, arranged to play freely on vertical guide-rods, J, and from thence through fixed guide-eyes K to and through eyes L in upper end of angular arm M. This arm M is attached to a transverse horizontal shaft, N, and it carries the forked lever *g* for holding the heddle-eye deposited on stationary needle. From the arm *m* the yarns are continued toward the end O of frame-work A, down around a grooved pulley P, into and along the groove Q of a needle, R, to the end S of same, passing out therefrom, the one yarn through an eye, *a*, on one side of the needle, and the other yarn from a similar eye, *a*, directly opposite on the other side of needle, and thence to the rig-bands, to which their ends are fastened, said rig-bands being extended along the length of the frame-work A from bobbins U to posts V, as will be hereinafter described. The needle R is made stationary, and is arranged along the length of the machine, extending from about the location of the guide-pulley P to and below the shaft N of angular arm M, and beyond said arm toward the end of the machine where heddle-yarn bobbins H are located. W, the twister of the machine. This twister is located in the machine at one side of the stationary needle R, and is, at the end of shaft X, in nearly the same horizontal plane as the needle, but at right angles thereto, turning in suitable bearings of frame-work A. Y, a pinion-wheel, secured to twister-spindle X. With pinion Y a gear-wheel, Z, interlocks, carrying on its shaft $A^2$ a pinion-wheel, $B^2$, interlocking with a vertical toothed racked bar, $C^2$. This rack-bar embraces the horizontal transverse shaft E, by which shaft and the arm $D^2$ of frame-work B said rack-bar is guided in its movement up and down, produced in the one case by the revolution of the cam $E^2$ fixed to said primary shaft E, and in the other by the spiral spring $F^2$. This arrangement of mechanism, it is obvious, imparts a reciprocating rotary movement to the twister-shaft X. $G^2$, a vertical shaft arranged just beyond needle R, with its axis in same vertical plane as the center line of needle R. This shaft $G^2$ terminates below the plane of the needle R, turning in bearings of the frame-work B. Its upper end is fork-shaped, and each tine has a similar arm, *b*, the two being parallel and projecting horizontally. The arms *b* in their width and distance apart are equal to the full size of the heddle-eye to be made. This construction of shaft $G^2$, just above described, is particularly shown by Fig. 6, plate 4. The said shaft $G^2$ at its lower end has a crank-arm, $H^2$, connected through a stud with a slotted slide, $I^2$. This slide $I^2$ moves in suitable guides of the frame-work B, and by a cam, $J^2$, of primary shaft F and spiral spring $K^2$, it is operated from time to time, imparting a reciprocating rotary movement to the shaft. This shaft $G^2$, with its arms *b*, constitutes what was previously termed in this description the heddle-eye former, and for convenience will be hereinafter so denominated. T, extension to slide $I^2$, through which it bears on cam $J^2$, to be operated thereby, as described. $L^2$, a fork-shaped bar, shown in detail in Fig. 7, plate 4. This bar is arranged in a corresponding plane to the needle, just beyond the heddle-eye former $G^2$, so that when operated it will pass between the upright arms of heddle-eye former. The extreme ends *f* of tines to bar $L^2$ are made as shown in Fig. 7. For moving bar $L^2$ to and fro between the arms of the heddle-eye former (it being suitably guided) the upper end of a vertical lever, $M^2$, is hung to it, which, extending below, is confined to the periphery of a cam, $N^2$, on primary shaft F, made of suitable shape to move the said bar $L^2$ forward, and to allow it, by the action of spiral spring $O^2$, to be drawn back to its original place. This slide-bar $L^2$ is the pusher, heretofore so called in this description. $P^2$ $P^2$, fork-shaped levers, two in number, and constructed with a hook, *c*, at the end of their tines. These levers $P^2$ are located one upon each side of the needle, and at their lower ends are hung to levers $Q^2$, pivoted by their end $R^2$ to the frame-work at $S^2$, and by their end $T^2$ are connected with the lower end of vertical pitmen-rods $U^2$, that at their upper ends are pivoted to levers $V^2$, in turn pivoted to the frame-work at $W^2$. The levers $V^2$ carry friction-bowls bearing on cams $X^2$ of the shaft $Y^2$, and actuating the levers $V^2$. This shaft $Y^2$ receives motion from the primary shaft F, to which in each case they are connected by bevel-gear wheels $Z^2$. The shafts $Y^2$, in addition to their connection with the fork-levers $P^2$, above described, are also connected thereto through crank-arms $A^3$ and short pitmen-rods $B^3$. The said vertical levers $P^2$ are what in the nature of this invention were called carriers for carrying the heddle-yarns to the rig-bands, and hereinafter will be so designated for convenience of reference. $C^3$ represents two fingers, arranged one on each side of the stationary needle R, between the tines of yarn-carriers $P^2$ below the stationary needle R, terminating at their lower end with horizontal arms $D^3$, projecting the one toward and beyond the other, and at such ends hung to a vertical piece, $E^3$. This piece $E^3$ is arranged to slide up and down in the frame-work of the machine, and to be actuated by a cam, $M^6$, on shaft E. $F^3$, studs of the yarn-carriers $P^2$, to act on the fingers $C^3$ to open them from the needle, as will be hereafter described. $G^3$, arms, two in number, one at each rig-band, and outside thereof. These arms $G^3$ are located transversely of the machine, and directly opposite each other. Their inner ends are hook-shaped, and by the outer ends of each they are fastened to short horizontal longitudinal shafts $H^3$, having arms $I^3$ arranged to bear upon the cam-edges $J^3$ of the cylinders $K^3$, said cylinders turning within upright brackets $L^3$ at the top of frame-work. These cylinders are driven as will be hereinafter described. The arms $G^3$ are for the purpose of receiving the yarns from the yarn-carriers $P^2$, and to hold them while the knitting-needles are operating, as will be presently described. For convenience of description they will be designated as the heddle-yarn holders. $M^3$ are barbed knitting-needles of the ordinary construction, one at and along the outside of each rig-band. These needles $M^3$ are secured to a common horizontal cross-head, $N^3$, suitably guided. $O^3$ and $P^3$, arms on rock-shaft $A^6$. The arm $O^3$ is connected to the cross-head $N^3$, and the arm $P^3$ bears on a cam, $Q^3$, of the primary shaft E, causing a movement of the cross-head $N^3$ in the one direction, and a spring, $R^3$, a movement in the opposite direction. The knitting-needles $M^3$ move through guide and supporting-eyes of fixed horizontal arms $S^3$. Against the outer end of these guide-arms $S^3$ presser-rollers $U^3$ of arms $V^3$ bear, conforming the rig-bands thereto. The arms $V^3$ are secured to brackets $L^6$ by adjustable connections. The end $J^1$ of needle-support and guides $S^3$ acts to knock off the stitches from the needles and spring-arms $J^2$ $J^2$ to press the needle-barbs down in the grooves of the needles when it is required to slip the loop off said needles.

The cylinders $K^3$ hereinbefore referred to are hollow from end to end, and the rig-bands from their bobbins are passed through them to the pins V. Said cylinders are arranged to rotate through gear-wheels $W^3$, $X^3$, and $X^6$, connecting them, with shaft $Y^2$, geared with the primary shaft F, as hereinbefore described. The cylinders each carry a bobbin, $Y^3$, having yarn wound upon it. These yarns are conducted through the cylinders $K^3$ to and through a guide-eye, $Z^3$, fixed to the cylinders $K^3$, thence to the rig-bands, to which they are fastened at the same point as the heddle-yarns. The posts V for the two rig-bands are, on a common cross-head or carriage, $A^4$, arranged to move upon fixed parallel horizontal guide-rods $B^4$.

To this carriage $A^4$ motion is communicated through a horizontal screw-shaft, $C^4$, shown by dotted lines in Fig. 1 of the drawing, driven by bevel-gears $D^4$, and said gears through a horizontal transverse shaft, $E^4$, driven, in its turn, from the driving-shaft D through the series of gear-wheels $F^4$, arranged along and upon one side of the machine.

The fork-lever and retainer *g* for heddle-eye, as before stated, is carried by the angular arm M, to which, at its end $B^6$, it is jointed. This fork-lever *g* is also connected to one end of a link, $C^6$, hung loosely by its other end upon a transverse horizontal shaft, $D^6$, below the shaft N, the shaft $D^6$ being arranged to turn in suitable bearings of the frame-work. To the shaft N is secured a lever, $E^6$, projecting downward into position to be acted upon by a cam, $F^6$, of the primary shaft E. By this cam $F^6$ the shaft N is moved in one direction, while by a spiral spring, $G^6$, connected to the lever $E^6$ it is moved in opposite directions. The movement of the fork-lever *g*, by the operation of the cam, is upward, and out of position about the heddle-eye on needle, and by the spiral spring $G^6$ downward and into position. By the link $C^6$ the movement of forked-lever *g* in and out of position with respect to the heddle-eye on needle R is more direct and straight, obviating all possibility of abrasion of the heddle-yarns. The forked-lever *g*, in addition to holding the heddle-eye, at the same time also holds the needle R from lateral play, releasing the needle, however, when it rises, so as to allow the harness, as made, to pass along the length of same.

In addition to the hold on the needle R by the forked-lever *g*, as above described, a presser-foot, $H^6$, is arranged, also for the same purpose. This presser-foot $H^6$ is formed so as to embrace the the sides of the needle R, and is fastened to the shaft $D^6$, hereinbefore referred to. This shaft $D^6$ is provided with a fixed lever-arm, $I^6$, extended to bear upon a cam, $J^6$, of the primary shaft E. By this cam $J^6$ said presser-foot is operated in the one direction, and by a spiral spring, $K^6$, connected with lever $I^6$, in the other direction. The plane of action of the presser-foot $H^6$ is just back of that of the heddle-eye holder *g*, and it holds the needle R from lateral play when the said fork-lever *g* is released. The two, however, it is obvious, are to operate the one after the other in such manner as not to interfere with the progress of the harness through the machine by the feed of the carriage $A^4$.

With the carriage $A^4$ moved to a position near the main frame B, the rig-band cords drawn off their bobbins U under guide-pulleys $G^4$, and thence to posts V, as described, weights $H^4$ being suspended to keep the rig-bands at a tension, the heddle-yarns drawn and extended to the rig-bands, and there fastened, as previously set forth, the yarn from lapper-bobbins properly drawn and fastened to the rig-bands, the operation of the within-described machine, power being applied to the driving-shaft D, is as follows: The yarn from one eye of the needle is seized by the twister W on such side, carrying it downward completely around the horizontal projecting arms *b* of heddle-eye former $G^2$, said former having been previously turned to bring said arms to point in the proper direction therefor. The heddle-eye former is then turned back, bringing its arms *b* in line with the stationary needle R, the twister turning back to allow the yarn to pass off of it, where, the former remaining stationary, the heddle-yarn wound around its arms *b* is then pushed by the pins $L^2$ from said arms onto the needle R, and along its length beyond its eyes, drawing, as a consequence, the yarns leading from such eyes along with it. The fork-lever *g* is now moved down, bringing its tines outside of but against the looped yarn or heddle-eye about the needle, holding it there, while on each side of the needle R the yarns stretching from ends of looped yarn to needle-eyes are taken by the vertical fingers $C^3$, pulled out from the needle toward the rig-band, and deposited on the hook ends of the carriers $P^2$, by which the two yarns are then carried to and beyond the rig-bands and deposited upon the yarn-holders $G^3$, there arranged for the knitting-needles to take hold of them. With the heddle-yarns thus held, and the yarn from each of the lapper-cylinders through their continuous rotary movement lapped or wound around the barbed needles and the rig-band cords, the heddle-yarns are taken by the needles in their forward movement the yarn-holders then dropping away from the yarn, when the needles move backward and close against the pressers in the usual manner of knitting, completing thus the last of the several stages of the operations of the machine. The movements thus described take place for each and every heddle-eye made in the machine, and during the same the carriage or cross-head $A^4$ is slowly carried or fed forward, so as to take the heddle-eye as formed sufficiently forward for another heddle-eye to be made.

In the operation of the several devices which act directly upon the harness-yarns, as above described, the gearing or other means employed between a continuous moving driving-shaft must be arranged and constructed to impart the motions necessary and at the proper time or times.

The particular movement of the several parts is as follows: The twister is reciprocating rotary, moving sufficiently around in the one direction to secure the disposition of the heddle-yarn seized by it upon the heddle-eye former, and then back to allow the yarn to pass off of it and to again take a heddle-yarn and twist it around the former for the next heddle-eye. The former $G^2$ is reciprocating rotary, but only through a portion of a circle—a quarter being sufficient—its plane of rotation and that of the twister being at right angles to each other, and the needle R being disposed as described. The heddle-eye retainer or lever *g* is intermittent rocking, moving down into and up out of the position stated, its movement downward occurring just after the deposit of heddle-eye on stationary needle R by pusher $L^2$, and its movement upward releasing the heddle-eye just after the stitching of the heddle-yarns to the rig-bands is completed. The heddle-eye pusher is rectilinear intermittent. The vertical fingers $C^3$ and heddle-yarn carriers $P^2$ have each both an upward movement and a movement toward the rig-bands. The movement of the fingers $C^2$ toward the rig-bands is only for a portion of the distance, while that of the yarn-carriers $P^2$ is for the entire distance and beyond the rig-bands, and they operate together as follows: The fingers first move, being acted on through their common holder $E^3$ by cam $M^6$ to shaft E, and are raised, passing through the concaves *m* of needles R, between needle and heddle-yarns stretched along it. In Fig. 4, plate 4, they are shown in their highest position; and then the yarn-carriers $P^2$, they each moving both upward and toward and beyond the rig-bands, cause at the same time a partial outward movement of the fingers $C^3$ from the needle. The upward and outward movements of the yarn-carriers are produced by the cam $X^2$ and crank-arm $B^3$ of shaft $Y^2$ operating conjointly through the arrangement of parts hereinbefore described, as disposed between said cam $X^2$ and crank-arm $B^3$. The outward movement of the fingers $C^3$ is produced by the impingement of the studs $F^3$ of yarn-carriers against the angular arm $D^3$ of such fingers, swinging necessarily such fingers outward, the yarn-carriers on one side of the needle swinging out the finger on the other or opposite side. By the continued movement toward the rig-bands of the yarn-carriers their studs $F^3$ escape or pass by the ends of finger-arms $D^3$, allowing the fingers to be thrown back to their position against the needle by the action of bent springs *n* properly applied therefor, while, at the same time, from their weight and that of their common carrier or slide $E^3$, they drop into position to be again raised. Before the fingers have reached the limit of their outward movement the hook ends of yarn-carriers have reached a position, both as to height and distance from needle, to take on their hooks the yarns drawn out from needle by the fingers, and before such fingers fly back to the needle. The yarn-carriers continue to carry the yarns to the rig-bands, as before described, depositing them on the yarn-holders $G^3$ there arranged, the yarn-carriers having a downward movement for so depositing their yarns on the holders.

The movement of the yarn-holders is vertical rocking, and their upward movement occurs in time to take the yarns from the yarn-carriers, drawing them up partially around the outside of rig-bands and knitting-needles, where, remaining stationary, the knitting-needles then are moved toward the delivery end O of the machine, seizing the yarns looped on said yarn-holders, which then lower, releasing the heddle-yarns for the knitting mechanism to complete the fastening to the rig-bands.

The movement of the forked lever *g* for holding heddle-eye in shape on stationary needle, while the yarn-carriers are conveying the heddle-yarn to the rig-bands, is vertical rocking.

The concavities *m* of the needle R allow the fingers $C^3$, when raised as described, to pass more freely between the heddle-yarns and needle. By the groove of the needle R the heddle-yarns passing to the heddle-eye are removed from rubbing against the heddle-eyes, being fed along the needle to the delivery end of the machine.

Having thus described my invention, I shall state my claim as follows:

1. The combination, with the twister W, of the means, substantially as described, for operating the same, as and for the purpose specified.

2. The combination of the yarn-holders $G^3$ with the yarn-carriers $P^2$ and barbed needles $M^3$, substantially as and for the purposes described.

3. The combination of the lapper-cylinders $K^3$, having guide-eyes, as described, with the yarn-holders $G^3$ and needles $M^3$, substantially as and for the purpose specified.

4. The combination, with the needle-guide and support $S^3$, of the presser-wheels $U^3$, when arranged and operating as and for the purpose described.

5. The combination, with the devices for forming heddle-eyes, substantially as described, of the devices for knitting the heddle-yarns to the rig-bands, substantially as and for the purpose described.

The above specification of my improvements in machines for making loom-harness signed by me this 8th day of March, 1871.

JOSEPH SLADDIN.

Witnesses:
ALBERT W. BROWN,
JOHN LORD.